Aug. 19, 1952  C. E. SLAUGHTER  2,607,074
TUBE SHEARING APPARATUS
Filed March 21, 1947
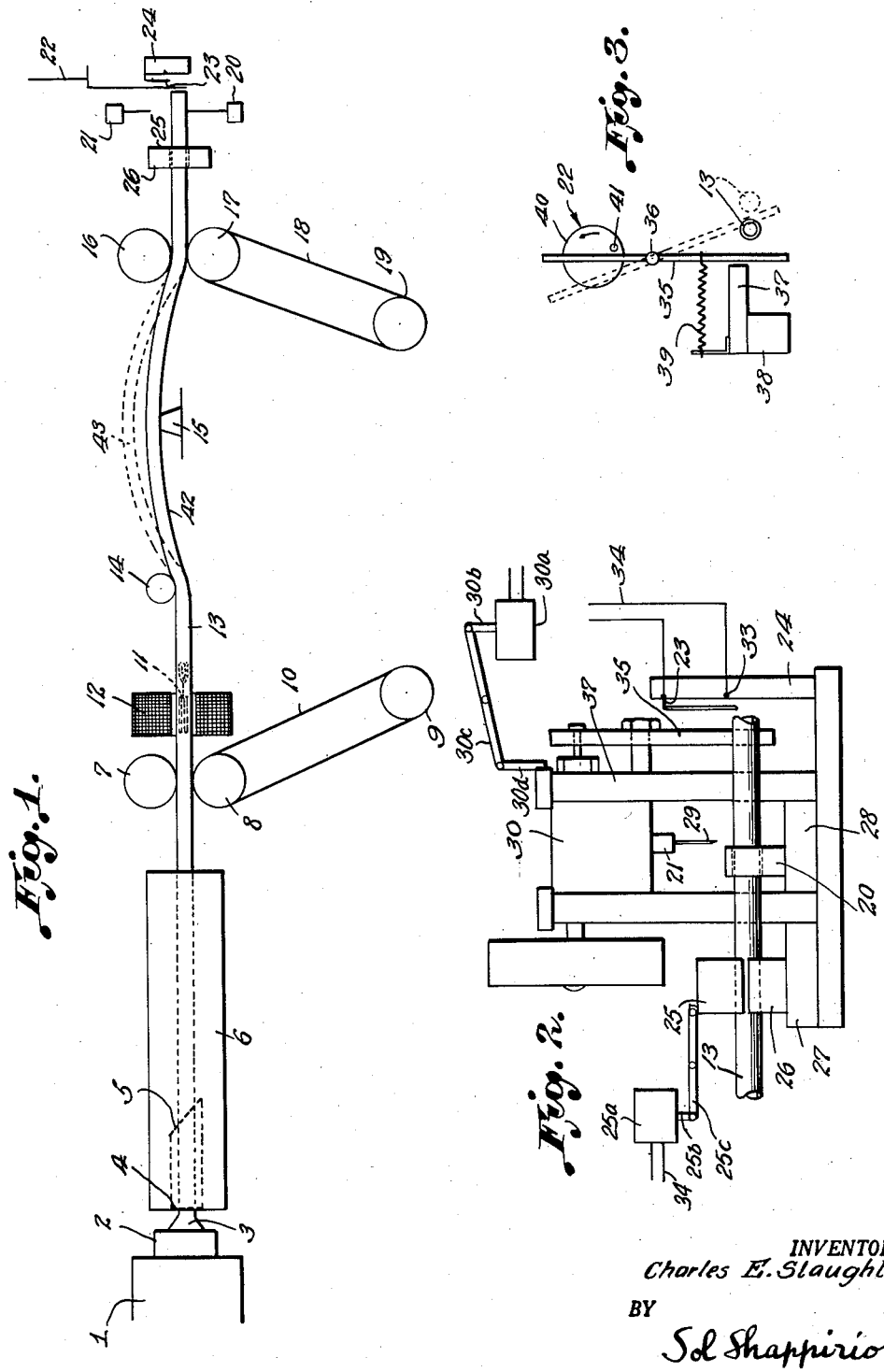
INVENTOR.
Charles E. Slaughter
BY
Sol Shappirio
Attorney.

Patented Aug. 19, 1952

2,607,074

UNITED STATES PATENT OFFICE 2,607,074

TUBE SHEARING APPARATUS

Charles E. Slaughter, New Canaan, Conn., assignor to Extruded Plastics, Inc., Norwalk, Conn., a corporation of Connecticut Application March 21, 1947, Serial No. 736,216

2 Claims. (Cl. 18—1)

This invention relates to apparatus for cutting tubes of predetermined length from tubing, particularly while the latter is being extruded continuously.

Tubing, such as thermoplastic tubing, is ordinarily manufactured in standard lengths such as 12 foot lengths. For many operations it is desired to have short lengths of tubing, as for example, in the production of containers from extruded plastic tubing. It is an extremely costly operation to take the standard 12 foot lengths of tubing and to cut therefrom predetermined lengths to produce tubes of a length of from 3 to 12 inches for example, which is commonly done by a hand operation.

In cutting predetermined lengths of tubes from tubing while the latter is being extruded continuously and is moving continuously, there are certain definite limitations which come into play and affect the operation. It is absolutely essential in cutting tubing that is moving continuously where the tubing is being extruded as for example, in the thermoplastic extrusion of tubing through dies, that there shall be no shock on the tubing that may be transmitted back to the point of the extrusion where the material is in semi-molten condition.

Among the objects of the present invention is the provision of apparatus for cutting predetermined lengths of tubes from long lengths of tubing, particularly extruded thermoplastic tubing.

Other objects include apparatus for carrying out such cutting operation during the continuous extrusion of such tubing.

Still further objects of the invention include apparatus for prevention of shock being transmitted back along the conveyors to the extrusion machine.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with that more detailed description, there is shown in the accompanying drawing, in Figure 1, a side elevation of a machine utilizable for shearing tubing in accordance with the present invention; in Figure 2, a side elevation of the locking, shearing and knock-out elements; and in Figure 3, a detail of a form of knock-out mechanism.

In accordance with the present invention an apparatus or machine for cutting plastic tubing to exact lengths is provided. The invention is particularly useful in connection with shearing or cutting, into exact lengths of from 3 to 48 inches or longer, tubing as it is being extruded, which length of tubes must be held to exact tolerance especially when utilized in the production of containers. The invention will be explained in connection with the production of such lengths of tubes used in the production of thin walled containers and sheared or cut from continuously extruded plastic tubing. In such continuous extrusion processes, the tubing may be extruded at any desired speed which will vary depending on the operations being carried out for example, from 20 feet to as high as 75 feet per minute. The speed depends upon the size and weight of the tubing as well as upon the output of the extrusion machine, for example reference may be made to the production of such tubes for thin walled containers from oval tubing which is extruded by the usual extrusion process from thermoplastic material at a rate of 20 feet per minute and the tubing is cut into exact lengths varying for example, from 5 inches to 17 inches overall. The present invention enables the cutting off operation to be carried out continuously and completely automatically.

In explanation of the process generally employed, the tubing from the extrusion machine passes through draw plates to control the size thereof and is cooled to self-supporting condition, in which condition it passes through rolls to control the exact rate of travel. Since the tubing is being continuously extruded, while the cutting or shearing operation is to be carried out while the end of the tubing is momentarily in stationary position, the tubing is desirably given a bow or arc over a portion of its length. From the bowed or arched position the tubing then passes through an open locking device, across a cutter block and comes into contact with a stop member. The pressure of the tubing as it pushes against the stop operates to close an electrical circuit whereupon a solenoid magnet is operated immediately to close the locking device and lock the tube in stationary position. At the same instant, the shearing means is operated to cut the tube to the required length. As soon as the severing operation has been completed, a swing arm or blast of air knocks the severed portion of the tube away from the stop, to break the electrical contact, while the cutter blade returns to normal position and comes to rest on its up movement when the electrical circuit has been broken. As soon as the circuit has been opened, the locking means opens, freeing the tubing for movement and permits the plastic tubing to advance again, against the stop to repeat the process outlined.

In order to overcome the possibility of shock being transmitted back along the conveyors to the extrusion machine, a substantial length of the extruded tubing is supported in front of the locking device and a portion of it is given a bow or arc as explained above. When the locking device locks the tubing temporarily in stationary position, extrusion is still taking place and the length of extruded tubing in front of the locking means is permitted to bow or arc to an extent sufficient to take up the increasing length of tubing while cutting is taking place. This enables the tubing to be temporarily held in a stationary position at the end thereof, although extrusion is still taking place from the die. After the severing operation, as soon as the locking means is released, the tubing pushes forward reducing the bow or arc therein and advancing the tubing to repeat the cycle of operations. High speed continuous cutting off operations may thus be carried out with no shock on the cutter and the operations may be made completely automatic minimizing labor problems. By actual use it has been found possible to cut plastic tubing for example, with a wall thickness of .025 inch to a length of approximately 6 inches at a speed of 65 lengths per minute with a maximum variation not over plus or minus .045 inch.

The drawing illustrates apparatus or machines which may be utilized for carrying out the present invention. As shown in Figure 1, the tubing is extruded continuously from the extruder 1 through the die 2 emerging as indicated at 3 from which it passes draw plates 4, 5 for sizing and shaping the tubing, these draw plates being maintained in the water trough 6. Any type of shaping and cooling device may be utilized at this point but the one illustrated is in conformity with Patent No. 2,333,520, patented August 28, 1945, entitled "Fabrication of Tubing." The extruded tubing emerges from the water trough 6 in self-sustaining condition and passes between the take off rolls 7 and 8, 9, which operate at a regulated constant speed to control exactly the speed of the extruded tubing. Roll 7 is an idling roll while roll 8 is operated by the belt 10 from the driven roll 9. Desirably the pressure of fluid within the tubing during the extrusion operation is controlled by means of the torpedo 11 and solenoid 12 in accordance with the invention of Patent No. 2,377,908, patented June 12, 1945, entitled "Extruded Thermoplastic Tubing."

In order to cause the tube to bow or arc any desired means may be employed, as for example, the tubing at 13 passes under an idling roll 14 over a support or block 15 and then under the idling roll 16. The roll 17 is driven by drive belt 18 operating over the driven roll 19. The rolls 17 and 19 cooperating with roll 16 serve to guide the tubing into the shearing mechanism. These rolls 17 and 19 are driven at a speed about 10% faster than rolls 8 and 9 and roll 19 is driven through a slipping clutch (not shown) so that the rolls may continue to operate even when the tubing is momentarily brought to stationary position. From the rolls 16, 17 the tubing passes through the locking means 25, 26 past the cutter 21 and continues past the knock-out mechanism 22 into the contact 23 carried on the stop block 24.

As more particularly shown in Figure 2, the locking means may take the form of a vice having upper and lower block members 25, 26, which blocks may be shaped to conform with the shape of the tubing. The lower block 26 is stationary and supported on any desirable support 27, while the upper block member 25 is movable and is operated by a solenoid 25a which actuates armature 25b connected to lever 25c at one end of the latter while the other end of 25c is connected to the upper block member 25. The tubing passes between the block members 25 and 26 while the latter are in open or non-locking position past the cutter block 20 mounted on any desirable base such as 28. The cutter block may have an opening similar to that of the tubing but slightly larger than the tubing so that the tubing will pass therethrough readily. The knife or shearing means 29 which may be of any desired shape such as square or pointed, is carried in an ordinary punch press 30. Movement of the punch press causes reciprocation or oscillation of the shearing means 29 to shear the tubing 13 at the cutter block 20. The tubing 13 moves past the cutting block 20 toward the stop member 24 carried on any desirable base support 31. Interposed between the end 32 of the tubing 13 and the stop 24, is a contact element 23 which may be of spring metal so that as the end of the tubing moves toward the stop 24, the contact element 23 is moved with the end of the tubing toward the stationary contact 33. As the contact elements 23 and 33 meet, the electrical circuit 34 is closed. Power may be supplied to circuit 34 from any desired source (not shown). The closing of the electrical circuit operates the solenoid which closes the locking device 25, 26 and holds the tubing momentarily against movement at the same time that the punch press 30 is operated to cause the cutter 29 to shear the tubing at the cutter block 20. Contacts 23, 33 effect an electrical circuit which activates the solenoid 30a and its armature 30b connected through lever 30c and arm 30d to a clutch of conventional form to start the press 30.

A knock-out element generally indicated at 22 is supplied to remove the sheared length of tubing forcibly away from the contact element 23 in order to open the circuit.

As more particularly shown in Figure 3, the knock-out element may take the form of an arm 35 pivoted at 36 for rotational movement, the pivot 36 being carried on the frame 37 of the punch press 30. The lower end of the arm 35 normally is at rest against stop 37 carried on the support 38, alongside of and adjacent to the tubing 13. A spring 39 attached to the arm 35 and stop 37 holds the arm 35 in its normal inoperative position as shown in Figure 3. Movement of the knock-out arm 35 may be carried out in any desirable way. For example, as shown in Figure 3, a rotating element 40 carries a pin 41 near its periphery. Rotation of the member 40 carries the pin 41 in counter-clockwise direction against the upper end of the knock-out arm 35 and moves it into the dotted line position shown in Figure 3. Such movement of the arm 35 knocks out the sheared length of the tubing 13 between the cutter block 20 and the stop 24 as shown in Figure 2. The movement of element 40 is correlated with the punch press and may actually be moved by the punch press shaft. The cutting or shearing operation takes place as the punch press shaft revolves and cuts the tube on the down stroke. When the tube has been cut, the pin 41 on rotating member 40 has moved against the upper end of the arm 35 to carry out the knocking-out movement described above.

The operation of the apparatus will be apparent from the description set forth above but it may be pointed out that as the tubing 13 passes under the roll 14 over block 15 and under roll 16 it is given an arc as shown at 42 and from such bowed position it moves through the locking device 20 which at this time is open, past the cutter block 21 toward the stop 24, passing the knock-out element 35. The movement of the tubing toward the block 24 carries the contact element 23 into contact with the contact 33 closing the circuit. Closure of the circuit operates the solenoid of the locking device 20 to move the upper block 25 of the device into locking position to hold the tubing temporarily in stationary position. At this time the cutter 29 is operated by the press 30, downwardly and then upwardly to sever or shear or cut the tubing at the cutter block 21 so that between the cutter block 21 and the stop 24, a desired length of tube has been cut from the tubing. During this time that the shearing operations are taking place and the tubing end is momentarily held against movement, extrusion is still taking place continuously and to take up the increasing length of tubing during such extrusion, the tubing 13 having been given a predetermined bow or arc 42 increases such bow or arc into the dotted line position 43 shown in Figure 1. As soon as the movement of the cutter 29 is completed, and it returns to its original position, the knock-out 35 is operated to knock the severed portion of the tubing 13 out of position thus releasing the contact element 23 which is urged away from the contact 33 by means of a spring (not shown) or the element 23 may be a spring metal element itself for this purpose. The circuit is thus broken, the clutch is disengaged when the press has returned to a position where the cutter 21 has been retracted and so that the locking means 25, 26 opens and the tubing 13 may then advance past the cutter block 21 for a repetition of the cycle of operations as just described.

The apparatus and method as described above are particularly useful in connection with cutting of thermoplastic tubing during continuous extrusion operations. It may, however, be employed for cutting operations on any type of tubing or shaped articles whether thermoplastic, thermosetting, metal, etc. Any length of tube or other article which it is desired to utilize may be fed by hand if desired through the device, past the cutting block, etc., in the manner explained above to cut lengths therefrom. But desirably the device is employed in connection with continuous operations for severing lengths as desired from continuously extruded thermoplastic shapes or tubing. The length of tube or other article which is severed may be controlled by having a movable cutter block mounted so that it may be moved with the punch press operating the severing element to or away from the stop 24 in order to shorten or lengthen the portion of the section severed.

The method and apparatus described above have given excellent results in actual practice in the rapid production of any desired length of tubes from continuously extruded tubing. A variety of modifications may be utilized. Thus in connection with the knock-out mechanism, there are many devices and methods that may be employed. For shorter lengths where there is not sufficient room for a knock-out of mechanical or electrical type, a blast of compressed air operated by the electrical circuit described connected to a solenoid operated air valve, may be used to knock-out the severed tube or other shape in order to open the circuit. Or instead of the mechanical device described in Figure 3, a solenoid may be operated through a switch which is closed when the blade of the cutter completes the cutting operation, such solenoid being placed at approximately the same point where the arm 35 is shown in Figure 2. Any desired means may be employed for such operations.

Having thus set forth my invention, I claim:

1. In a shearing device for prevention of transmission of shock back to the extrusion die in cutting plastic tubing to length during continuous extrusion of such tubing from heated plastic in nonself-sustaining condition through an extrusion die and cooling of said extruded tubing at a substantial distance from said extrusion die to self-sustaining condition, in combination, means for continuously extruding tubing from heated plastic in nonself-sustaining condition, means for cooling said extruded tubing to self-sustaining condition at a point substantially removed from said extrusion means, means operative independently of any shearing means for temporarily locking the extruded tubing against movement at a point where said tubing is in self-sustaining condition and at a substantial distance from said extrusion means, means operable independently of said locking means for shearing said tubing while in locked position said shearing means being carried on a support fixed during shearing against movement in the direction of extrusion, and means for releasing said locking means after said shearing operation, all of said means being operable during continuous extrusion, means positioned between the cooling means and the locking means for arcing the tubing while locked against movement.

2. In a shearing device as in claim 1, the extruding means, the cooling means, the locking means and the shearing means being alined to produce straight line operation, the arcing means including a block to divert the tubing from a straight line into arced condition.

CHARLES E. SLAUGHTER.

REFERENCES CITED

The following references are of record in the file of this patent:

UNITED STATES PATENTS

| Number | Name | Date |
| --- | --- | --- |
| 482,917 | Dix | Sept. 20, 1892 |
| 1,269,635 | Neuman | June 18, 1918 |
| 1,367,513 | Mann | Feb. 1, 1921 |
| 1,407,712 | Stevens | Feb. 28, 1922 |
| 1,920,389 | Hawkins et al. | Aug. 1, 1933 |
| 2,149,430 | Fleming | Mar. 7, 1939 |
| 2,309,755 | Davis | Feb. 2, 1943 |

FOREIGN PATENTS

| Number | Country | Date |
| --- | --- | --- |
| 144,379 | Austria | Jan. 25, 1936 |
| 656,051 | Germany | Jan. 28, 1938 |